(No Model.)

A. F. RANSOM.
BLIND FOR BRIDLES.

No. 334,050. Patented Jan. 12, 1886.

Witnesses:

Inventor

UNITED STATES PATENT OFFICE.

ALBERT F. RANSOM, OF BURLINGTON, WISCONSIN.

BLIND FOR BRIDLES.

SPECIFICATION forming part of Letters Patent No. 334,050, dated January 12, 1886.

Application filed May 25, 1885. Serial No. 166,573. (No model.)

*To all whom it may concern:*

Be it known that I, ALBERT F. RANSOM, a citizen of the United States, residing at Burlington, in the county of Racine and State of Wisconsin, have invented certain new and useful Improvements in Blinds for Bridles or Headstalls, of which the following is a specification, reference being had therein to the accompanying drawings.

The object of my invention is to improve and simplify the construction of bridles and headstalls by providing a single device which will take the place of the ordinary blinds or winkers, the winker-stays, the winker-loops, and the brow-band, and which will also serve the purpose of a hood or visor to protect the face and eyes of the animal more or less from sun and storm, and prevent it from looking over the blind.

Figure 1:
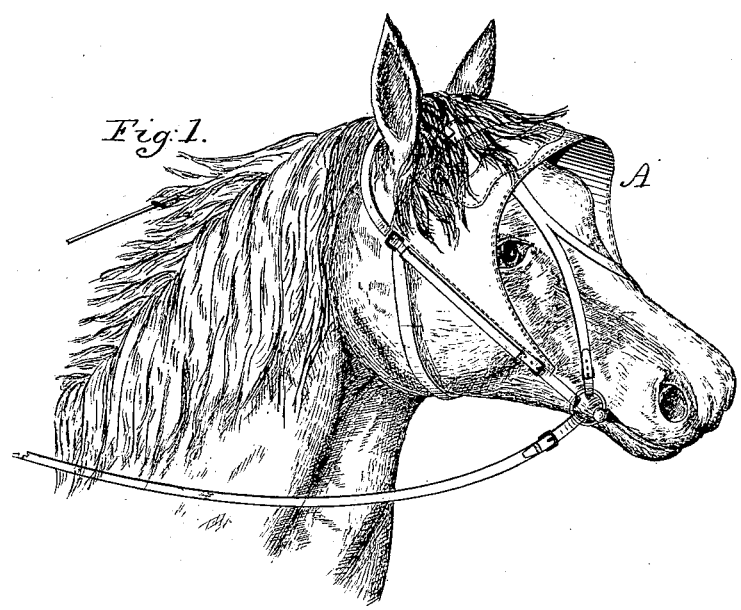
Figure 2:
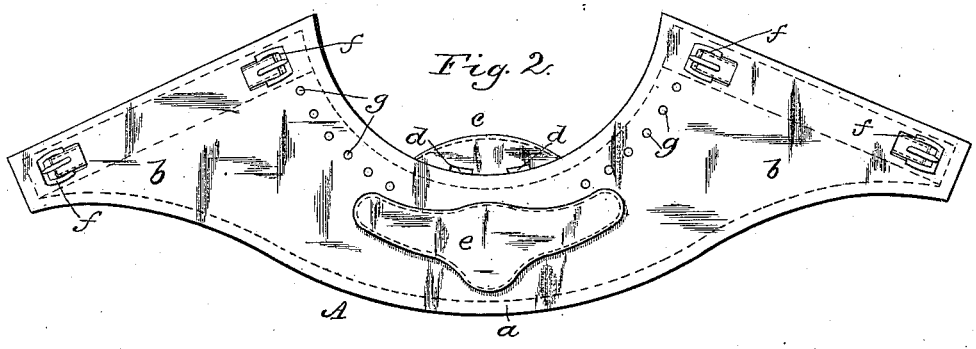

In the drawings, Figure 1 is a perspective view illustrating my invention as it appears in use, and Fig. 2 is a detail plan view of the same spread out.

A indicates my blind, which consists of a piece of suitable material, preferably leather, having a curved central portion, a, to form a visor, and end portions, b, to form the blinds or winkers, the whole, when bent into proper shape, constituting a hood adapted to shield the eyes and upper part of the animal's face. The upper side of the central portion, a, is provided with an extension, c, having slots or holes d for the attachment of the overcheck or supporting straps thereto, and said central portion, a, is also preferably provided with a stiffening-piece, e. If, however, the blind-piece A be made of light material, the stiffening-piece should extend the entire length thereof. Buckles f are secured to the blind-piece for the attachment of the side straps of the headstall, and the upper side of said blind-piece is preferably provided with holes or openings g, to insure proper ventilation.

When constructed in the manner above described, my blind extends from one side strap of the headstall to the other, and will at all times retain its shape, as shown in Fig. 1, in which position it will effectually shield the eyes of the animal without the objectionable flapping against the eyes and sides of the animal's head incidental to the use of ordinary blinds.

My device also simplifies the construction of the headstall, as the single piece A takes the place of the ordinary blinds, the loops or keepers and stays therefor, and also the front or brow band of the headstall.

I am aware that headstalls have heretofore been provided with hoods for shielding the eyes and face of the animal more or less, and I do not therefore wish to be understood as claiming a headstall-hood, broadly.

The holes d for the overcheck, instead of being made in the extension e, may be made in the upper side of the central portion, a, of the blind-piece A, and in such case the extension e may of course be omitted.

An important advantage resulting from the use of my blind when constructed in the manner described is that it will be impossible for the animal to see over the same, owing to the forwardly-projecting visor, and this feature renders my invention particularly valuable in breaking young horses or in the working of balky or vicious animals.

Having thus described my invention, I claim as new and desire to secure by Letters Patent—

1. A headstall provided with a single blind extending from one side strap thereof to the other, the central portion of said blind forming a single forwardly-projecting visor, substantially as set forth.

2. A blind for headstalls, consisting of the central curved portion, a, provided with a stiffening-piece, e, and the end portions, b, forming the sides of the blind, substantially as set forth.

3. A blind for headstalls, adapted to extend from one side strap of the headstall to the other, said blind consisting of the central curved portion, a, and end pieces, b, and being provided on its upper side with a series of ventilating-holes, g, substantially as set forth.

4. A blind for headstalls, adapted to extend from one side strap of the headstall to the other, said blind consisting of the central curved portion, a, forming a forwardly-projecting visor, and end portions, b, forming the sides of the blind, the upper side of said blind being provided with holes d for the overcheck, substantially as set forth.

In testimony whereof I affix my signature in presence of two witnesses.

ALBERT F. RANSOM.

Witnesses:
C. W. WOOD,
BRINCA NEUHAUS.